United States Patent
Heintzmann et al.

(10) Patent No.: US 6,909,105 B1
(45) Date of Patent: Jun. 21, 2005

(54) METHOD AND DEVICE FOR REPRESENTING AN OBJECT

(75) Inventors: Rainer Heintzmann, Göttingen (DE); Christoph Cremer, Heidelberg (DE)

(73) Assignee: Max-Planck-Gesellschaft zur Forderung der Wissenschaften e.V. (DE)

( * ) Notice: Subject to any disclaimer, the term of this patent is extended or adjusted under 35 U.S.C. 154(b) by 0 days.

(21) Appl. No.: 09/914,515

(22) PCT Filed: Mar. 2, 2000

(86) PCT No.: PCT/EP00/01806
§ 371 (c)(1),
(2), (4) Date: Oct. 24, 2001

(87) PCT Pub. No.: WO00/52512
PCT Pub. Date: Sep. 8, 2000

(30) Foreign Application Priority Data

Mar. 2, 1999 (DE) .......................................... 199 08 883

(51) Int. Cl.⁷ ................................................ G01V 8/00
(52) U.S. Cl. .................................... 250/559.04; 250/550
(58) Field of Search ............ 250/201.3, 559.04–559.06, 250/559.39, 208.1, 550, 237 R, 237 G

(56) References Cited

U.S. PATENT DOCUMENTS

| | | | |
|---|---|---|---|
| 4,525,858 A | | 7/1985 | Cline et al. |
| 4,621,911 A | | 11/1986 | Lanni et al. |
| 4,631,581 A | | 12/1986 | Carlsson |
| 4,929,951 A | | 5/1990 | Small |
| 5,034,613 A | | 7/1991 | Denk et al. |
| 5,640,270 A | * | 6/1997 | Aziz et al. .................. 359/368 |
| 5,671,085 A | | 9/1997 | Gustafsson et al. |
| 5,731,588 A | | 3/1998 | Hell et al. |
| 5,777,732 A | | 7/1998 | Hanninen et al. |
| 5,796,112 A | | 8/1998 | Ichie |
| 5,801,881 A | | 9/1998 | Lanni et al. |
| 5,828,459 A | | 10/1998 | Silberberg |
| 5,841,149 A | * | 11/1998 | Spink et al. ........... 250/559.29 |
| 5,867,604 A | | 2/1999 | Ben-Levy et al. |

FOREIGN PATENT DOCUMENTS

| | | |
|---|---|---|
| DE | 43 26 473 A1 | 2/1995 |
| EP | 0 352 975 A2 | 1/1990 |
| EP | 0 491 289 A1 | 6/1992 |

(Continued)

OTHER PUBLICATIONS

David R. Sandison et al., *Quantitative Fluorescence Confocal Laser Scanning Microscopy (CLSM)*, James B. Pawley, editor, Handbook of Biological Confocal Microscopy, Chapter 3:47–50, 1995.

Ernst H.K. Stelzer et al., *Fundamental Reduction of the Observation Volume in Far–Field Light Microscopy by Detection Orthogonal to the Illumination Axis: Confocal Theta Microscopy*, Optics Communications, 111:536–547, 1994.

Roger Y. Tsien et al., *Fluorophores for Confocal Microscopy: Photophysics and Photochemistry*, James B. Pawley, editor, Handbook of Biological Confocal Microscopy, Chapter 16:267–268, 1995.

(Continued)

*Primary Examiner*—David Porta
*Assistant Examiner*—Stephen Yam
(74) *Attorney, Agent, or Firm*—Piper Rudnick LLP

(57) ABSTRACT

A process for obtaining an object image of at least one object (40) is described, wherein at least two partial images of the object (40) are taken under differing object conditions which are formed on the object with spatial patterns, wherein a non-linear dependence of the light detectable from the object point on the object conditions given at the object point exists and the partial images contain different contributions of various space frequency components of the object structure, and the desired object image is determined from the partial images by reconstruction of the space frequency components. Optical systems for implementing this type of process are also described.

23 Claims, 8 Drawing Sheets

FOREIGN PATENT DOCUMENTS

| | | |
|---|---|---|
| EP | 0 562 488 A1 | 9/1993 |
| WO | WO 91/07682 | 5/1991 |
| WO | WO 97/06509 | 2/1997 |
| WO | WO 97/11355 | 3/1997 |
| WO | WO 97/31282 | 8/1997 |
| WO | WO 98/45745 | 10/1998 |

OTHER PUBLICATIONS

T. Wilson et al., *A New Approach to Three Dimensional Imaging in Microscopy*, Cell Vision, vol. 4, No. 2, 231, Mar. 1997.

T. Wilson et al., *An Aperture Correlation Approach to Confocal Microscopy*, Proceedings of SPIE, vol. 2984:21–23, 1997.

Robert Windecker et al., *Three–Dimensional Topometry with Stereo Microscopes*, Optical Engineering, 36(12):3372–3377, Dec. 1997.

Mats G.L. Gustafsson et al., *3D Widefield Microscopy With Two Objective Lenses: Experimental Verification of Improved Axial Resolution*, Proceedings of SPIE, 2655:62–66, 1996.

R. Heintzmann et al., *Laterally Modulated Excitation Microscopy: Improvement of Resolution by Using a Diffraction Grating*, Proceedings of SPIE, 3568:185–196, 1999.

S. W. Hell et al., *Ground–State–Depletion Fluorescence Microscopy: A Concept for Breaking the Diffraction Resolution Limit*, Applied Physics B 60, 495–497 (1995).

R. Juškaitis et al., *Efficient Real–Time Confocal Microscopy With White Light Sources*, Nature, vol. 383:804–806, Oct. 1996.

Frederick Lanni et al., *Excitation Field Synthesis as a Means for Obtaining Enhanced Axial Resolution in Fluorescence Microscopes*, Bioimaging 1 (1993) 187–196.

Steffen Lindek et al., *Two New High–Resolution Confocal Fluorescence Microscopies (4Pi, Theta) With One—and Two—Photon Excitation*, James B. Pawley, editor, Handbook of Biological Confocal Microscopy, Chapter 26:417–430, 1995.

M.D. Duncan, *Molecular Discrimination and Contrast Enhancement Using a Scanning Coherent Anti—Stokes Raman Microscope*, Optics Communications, vol. 50, No. 5:307–312, Jul. 1984.

Stefan Hell et al., *Properties of a 4Pi Confocal Fluorescence Microscope*, Journal of the Optical Society of America, vol. 9, No. 12:2159–2166, Dec. 1992.

* cited by examiner

Simulation with side illumination

— With saturation effect + algorithm
······ Epifluorescence + HF amplification

Simulated OTF of the whole system

— Conventional
······ Saturated

METHOD AND DEVICE FOR REPRESENTING AN OBJECT

FIELD OF THE INVENTION

The invention concerns a process for object imaging with high spatial resolution capability, particularly a light-optical microscope imaging process, and devices for performing this type of process.

BACKGROUND

The resolution capability of optical imaging systems is often decisively determined by the object-side aperture of an objective lens and its index of refraction. Light going out from an object can only be detected if it hits the objective within the acceptance angle of the objective. The higher the resolution capability is, the higher the spatial frequencies of the object structure to be imaged which can be detected. The detection of the spatial frequencies is described by the light-optical transfer function or modulation transfer function (in the following: OTF) of the optical systems. The OTF indicates which spatial frequencies, from which the object can be constructed by means of Fourier transformation, are retained in the optical imaging, and/or how parts of the spatial frequencies are attenuated. The resolution capability of the optical system (e.g. a light-optical microscope) is determined by the range in which the OTF of the system does not vanish. If the OTF vanishes completely in sections of reciprocal space, it is impossible, without additional assumptions about the object structure (e.g. spatial limitation, positivity), to reconstruct the corresponding spatial frequencies in an object image. There is general interest in the extension of the OTF in the largest possible region in reciprocal space, in order to increase the resolution of the optical system.

Conventional processes for increasing the resolution capability are particularly directed toward a suitable selection of the object illumination. Thus, for example, in the confocal microscope the object is illuminated on one side preferably point by point with a focused beam of light and simultaneously scanned, with the detection often being limited to one small region of the object by means of a diaphragm (cf. e.g. U.S. Pat. No. 4,631,581).

In the 4Pi microscope described in EP 0 491 289, there is coherent illumination and, depending on the embodiment, also detection on both sides of the object. In the wave field microscope, typically illumination is performed with coherent plane light waves from opposing sides (cf. e.g. U.S. Pat. No. 4,621,911; F. Lanny et al. in "Bioimaging", Vol. 1, 1993, p. 187 et seq.; U.S. Pat. No. 5,801,881). In the $I^5M$-microscope, there is coherent illumination on both sides and coherent detection, in that the two images of the object are brought into interference on a locally resolving detector (cf. U.S. Pat. No. 5,671,085; M. G. L. Gustafsson et al. in "Proceedings of SPIE", Vol. 2655, 1996, p. 62 et seq.). A theta microscope is described by E. H. K. Stelzer et al. in "Opt. Commun.", vol. 111, 1994, p. 536 et seq. and S. Lindeck et al. in "Handbook of Biological Confocal Microscopy", editor J. B. Pawley, Plenum Press, New York 1995, chapter 26, p. 417 et seq., in which light is detected from three sides, with illumination similar to confocal or 4Pi being used. Because the resolution along the optic axis of the illumination is particularly large for lateral detection in the object plane, one obtains a reduced focused volume overall.

Using a spatially varying (e.g. sinusoidally varying) illumination in stereomicroscopic surface topography processes is also known. By calculating the images measured, conclusions can be drawn about the surface structure of the object (cf. e.g. U.S. Pat. No. 4,525,858; R. Windecker et al. in "Optical Engineering", vol. 36, 1997, p. 3372 et seq).

A process for high-resolution three-dimensional imaging by detecting optical sections of the object, similarly to confocal microscopy, is described in WO 97/31282. It is based on taking multiple images, each with different patterns, from illumination apertures and associated detection apertures. Through suitable reconstruction processes, an image which is equivalent to that of a confocal microscope can be calculated from the data picked up. This process is also referred to as "Aperture Correlation Microscopy" (cf. also R. Juskaitis et al. in "Nature", vol. 383, 1996, p. 804 et seq, T. Wilson et al. in "Proceedings of the SPIE", vol. 2984, 1997, p. 21 et seq). A process is known from WO 98/45745 which is based on illumination with imaging of a diffraction grating or with two interfering laser beams (cf. also T. Wilson et al. in "Cell Vision", vol. 4, 1997, p. 231 et seq). A similar process for laterally increasing the resolution capability is used in the publication of R. Heintzmann et al. in "Proceedings of SPIE", vol. 3568, 1999, p. 185 et seq.

The conventional technologies have the following disadvantages. The imaging processes are connected with a relatively large technical outlay. Thus, particularly in the 4Pi, $I^5M$, and theta microscopes, the adjustment is especially difficult. In addition, the processes are difficult to realize because they can be integrated in existing microscopic systems at great expense only. In the wave field microscope, it is a significant problem that the OTF has regions in the axial direction in which it vanishes. In addition, the wave field microscope and/or the 4Pi microscope do not provide any increase in resolution in the lateral direction in comparison with typical epifluorescence microscopy and/or confocal fluorescence microscopy.

Furthermore, many processes (particularly confocal laser scanning, 4Pi, and theta microscopy) are connected with a point by point scanning of the object. This is time-consuming and problematic, above all in the imaging of time-dependent procedures. Scanning processes require very fast detectors (e.g. photomultipliers) which, however, often have a significantly lower detection efficiency than detectors with localized resolution (e.g. CCD's). In fluorescence microscopy, there is the additional problem that the useful illuminance is restricted by the maximum excitation rate of the dye in the focus. This additionally restricts the maximum scanning speed.

Microscopic imaging processes based on non-linear effects are also known. Thus, for example, in U.S. Pat. Nos. 5,034,613, 5,777,732, 5,828,459, and 5,796,112, so-called multiphoton microscopy is described. The confocal effect is achieved in this case by the simultaneous absorption of multiple photons at specific object locations. Other techniques are based on stimulated emission (cf. U.S. Pat. No. 5,731,588, DE-OS 44 16 558) or the depopulation of the ground state of fluorescence molecules by intentionally pumping them into the longer-lived triplet state (cf. S. W. Heil et al. in "Applied Physics B", vol. 60, 1995, p. 495 et seq).

Until now, no significant increase of the resolution capability has been able to be achieved with the processes based on non-linear optical effects. This is particularly associated with the individual photons having to have relatively low energies and therefore large wavelengths to achieve multiphoton absorptions. In addition, the transfer efficiency at higher spatial frequencies is generally very poor, because typically only a very small part of the illumination pattern contains high spatial frequencies.

OBJECTS

The object of the invention is to indicate an improved imaging process with a high resolution capability. The process is, in particular, to overcome the disadvantages mentioned above of conventional microscopy processes, to be able to be realized with a simplified technical outlay, to allow rapid imaging, even of time-dependent procedures, and to be compatible with current optical systems. The process according to the invention is furthermore to allow known microscopic processes to be expanded in such a way that the resolution capability is additionally increased, while maintaining their respective advantages. It is also the object of the invention to indicate an optical system for performing these types of improved processes.

SUMMARY OF THE INVENTION

The basic idea of the invention is, for obtaining an object image (image of an object structure), to record at least two partial images of an object under different object conditions, which are implemented on the object with spatial patterns, with a non-linear function of the light detectable from the object point on the object conditions given at the object point existing for each object point and the partial images containing different contributions of various spatial frequency components of the object structure, and to obtain the desired object image from the partial images through reconstruction of the spatial frequency components. Achieving object conditions with various spatial patterns to detect the various partial images has the advantage that virtual higher and lower frequent spatial frequency components are produced in the pattern of the object conditions to which the spatial frequency components of the object structure are coupled. Due to this coupling, the spatial frequency components of the object structure are displaced relative to the statial frequency interval which is open for image detection according to the light-optic transfer function (OTF). The complete object image can be reconstructed from the partial images with a correspondingly expanded spatial frequency range.

Through the use of a non-linear relationship between the light going out from the object and the local object point related value of a further spatially changing dimension (e.g. the local irradiation or illumination intensity), the spatial frequency range effectively transferred from the system as a whole can be significantly expanded. Through local variation of the influencing variable and the recording of multiple partial images, an object image can be reconstructed whose resolution is, due to the non-linearity, fundamentally higher than the resolution given by the Abbe limit. Various possibilities can be selected according to the application for generating non-linear effects. Obtaining the object image from the partial images is also possible with various types of data evaluation, depending on the application.

An important feature of the invention is the setting of predetermined object conditions with different spatial patterns. Object conditions, upon which the detected light is non-linearly dependent, are set point by point on the object corresponding to the current pattern. According to a first embodiment of the invention, the setting of predetermined object conditions is the formation of a spatial pattern of at least one object condition, upon which the respective amount of light detected is nonlinearly dependent. According to an altered embodiment of the invention, the setting of predetermined object conditions comprises the generation of a spatial pattern of at least two different object conditions, with there being a dependence of the quantity of light detected on a multiplicative linking of the object conditions and a linear or a non-linear dependence of the quantity of light detected on each of the object conditions. In general, a multilinear dependence of the quantity of light detected (e.g. the detected light intensity or light phase) is referred to.

The number of partial images depends on the number of spatial frequency components measurable during the image reconstruction and to be considered, depending on the application, in the pattern of the light sent out from the object. This number is particularly dependent on the object conditions used to introduce the nonlinearity and on the quality of the imaging process realized. If the number of spatial frequency components mentioned is Z, then, as a rule, at least Z partial images are to be recorded. However, depending on the case, it can also be sufficient to record fewer partial images if sufficient information for reconstruction of the object image is present. The number of partial images is permanently set or set automatically depending on the quality of the object image obtained and/or manually by the user of the optical system.

The process according to the invention particularly comprises the following steps: (a) adjustment of the conditions obtaining in the object which are able to influence the light going out from an object point in such a way that a non-linear dependence of the light intensity detected from an object point on the value of a spatial pattern contained in at least one object condition is produced in at least one detectable value or a linear dependence to one value at a time of the light intensity detected from this object point on the values of at least two spatial patterns is produced, (b) recording of at least one single image under these object conditions, (c) changing the object conditions in such a way that different spatial frequency components of the object formed by the recording process change in their amplitude and/or phase relationship to one another, (d) recording of at least one further single image under object conditions changed each time according to (c), and (e) evaluation of the measured images, in that the object conditions emphasized differently in the individual images are used to obtain information about the object, associated with spatial frequencies of the object, which was not accessible through simple imaging with the recording process.

An optical system according to the invention for object imaging is particularly characterized by a pattern generator, which is set up for achieving and adjusting predetermined spatial patterns of object conditions on which the light detected from an object is nonlinearly dependent, and an image generator for reconstruction of the object image from the partial images detected.

The invention has the following advantages. The obtaining of object images can be realized relatively easily. The adjustment of the optical system is restricted to a minimum outlay for adjustment. The invention can be implemented by fitting existing imaging systems.

It is particularly advantageous that high spatial frequencies which are possibly strongly suppressed in imaging objectives can now be detected more efficiently due to the displacement in the frequency space. In addition to the lateral increase in resolution, there is also an axial increase in resolution and the capability of discriminating planes which are perpendicular to the optic axis in the axial direction. The invention thus provides advantageous usages such as confocal microscopy. With utilization of the non-linear dependency of the quantity of light detected on the object conditions, the possibility of a significant increase in resolution in the axial direction also results.

The invention can be advantageously used in combination with typical imaging processes, particularly microscopy processes. This particularly concerns the above-mentioned techniques and absorption microscopy, reflection microscopy, the locally resolved imaging of fluorescence lifetimes (so-called "fluorescence lifetime imaging"), multiphoton microscopy, interference microscopy, confocal microscopy, etc.

The imaging process according to the invention has a high image recording speed. The imaging can, for example, occur with a CCD camera at all object points in the image plane simultaneously and therefore can be significantly faster than scanning processes.

The invention can be realized using greatly differing non-linear effects. For example, in a fluorescence microscope, illumination can occur with an intensity such that fluorescence dyes in the object are saturated. This also allows various dyes or dyes in various environments (e.g. in various binding states), which can otherwise be differentiated only poorly, to be discriminated on the basis of differing non-linear characteristics (saturation characteristics).

BRIEF DESCRIPTION OF THE DRAWINGS

Further advantages and characteristics of the invention will be obvious in the following from the description of the attached drawings.

DETAILED DESCRIPTION

Figure 1:
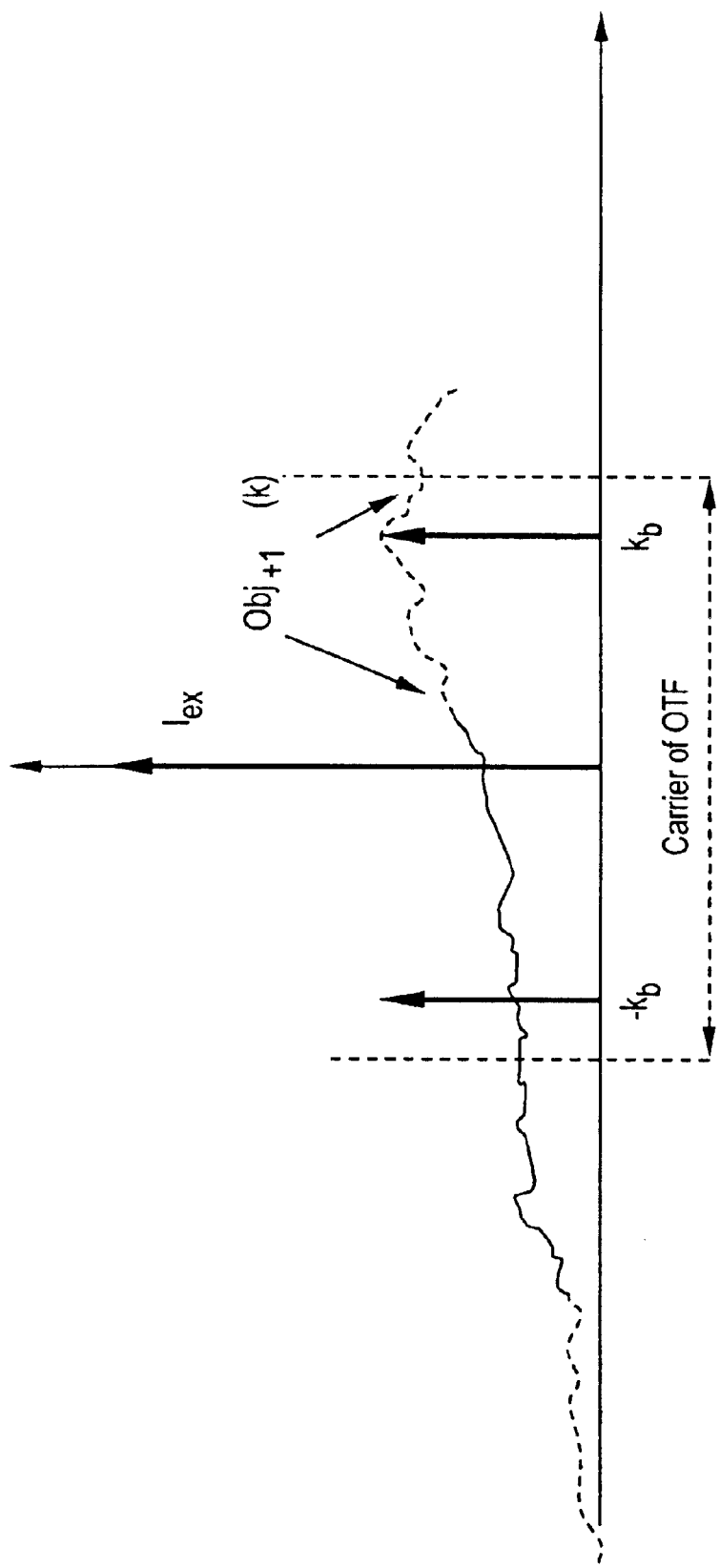
FIG. 1 shows an illustration of object illumination in reciprocal space with sinusoidal illumination at low intensity.

The invention is first described in the following with reference to the theoretical foundations and then explained with reference to various examples. The invention is not restricted to the exemplary embodiments given. Altered embodiments under correspondingly varied object conditions can be realized depending on the application, particularly within the framework of the following statement of the concept.

The object or sections of the object to be detected during optical imaging are generally referred to in the following as "object". Objects are, in particular, all types of biological or synthetic samples which are examined with typical imaging processes and localized resolution analysis processes, particularly microscopy and spectroscopy processes. Applications result, for example, in biology, medicine, chemistry, semiconductor technology, single molecule spectroscopy, and similar fields. The object can be solid, liquid, or gaseous.

"Object conditions" are generally understood to mean all parameters and/or conditions at the location of the object with which one or more characteristics of the light going out from the object can be influenced. These characteristics particularly include the intensity, the polarization state, the phase, the color, the pulse shape, the pulse length, the degree of coherence, the photon correlation, and similar characteristics. Object conditions can comprise inherent physical or chemical characteristics of the object, such as a specific material composition, a temperature distribution, or a pressure distribution, or externally applied parameters, such as the illumination intensity on the object surface or in the object.

The implementation of the object conditions with a spatial pattern means that the object conditions can be described with a specific position dependency. The pattern can be characterized by a structure (e.g. a point or line pattern) or can also be structureless (the same object conditions apply for all points on the object). The recording of partial images under varying object conditions means that, between the exposures, the pattern itself is changed (e.g. with a DMD reflector, see below), the position and/or orientation of the pattern relative to the sample is changed (e.g. with a displaceable diffraction grating, see below), and/or an intensity characteristic of the pattern (e.g. with a variation of the intensity of the object illumination, see below) is changed.

A "non-linear dependence" of the light going out from the object and/or detected with a detector is given if its light intensity of the location of the light emission (or scattering or similar activity) does not measurably follow a simple linear model of the current object condition. In a development of functions, e.g. Taylor expansion (see below), of the detected light, terms of higher orders occur. According to the embodiments of the invention mentioned above, a non-linear dependence of the light intensity can be given by one object condition at a time or a linear dependence of the light intensity can be given by multiple object conditions. In the latter case, mixed terms arise in the development of functions which allow the expansion described below of the detectable object spatial frequencies.

The "detected light intensity", which is the light intensity measured by the detector, can, depending on the application, deviate from the average light intensity obtaining at the location of the detector according to the functionality of the detector, if, for example, the detection is time modulated or a raw detector signal is correlated with other signals (e.g. through lock-in technology).

A "partial image" or "individual image" is generally understood to mean image data which are recorded with an imaging light-optical process in its widest sense. This can be a single data point, or multiple data points or data point regions recorded at one or various object points in one, two, three, or more dimensions. The alteration of object conditions according to the invention during the recording of various partial images can be provided for an alteration or modulation for each data point, for sections or groups of data points, or for entire two- or three-dimensional images or even time series.

"Detectable spatial frequency components" are generally understood to mean the components of the frequency space of the Fourier transforms of the objects which are detectable in principle with the respective imaging processes used.

The invention allows not only an object image with increased resolution capability, but also the obtaining of "information about the object". This is particularly understood to include the spatial distribution of one or more characteristics of the object or other parameters, such as the position in space of a partial object known by its structure or the composition of the object.

Basic Principles of Image Acquisition

Image recording is described in the following with reference to the example of fluorescence microscopy. In fluorescence microscopy, objects which are marked with fluorescence dyes or which fluoresce independently are imaged. Depending on the object structure and/or labeling technique, labeling dyes collect, for example, in specific sections (e.g. in the cell nucleus of a biological cell). To acquire the image, the object is irradiated with a suitable excitation wavelength and the emitted fluorescence radiation is detected. Fluorescence dyes emit with an intensity which is proportional at a first approximation to the intensity of the light irradiated at the location of the dyes. In contrast to absorption microscopy, reflection microscopy, or even phase contrast microscopy, the emissions generally occur incoherently to one another. Assuming a proportionality between the fluorescence intensity emitted at an object point to the light intensity of the excitation light irradiated there, a detected image $I_m(\vec{x})$ (converted back into object space coordinates $\vec{x}$) can be described as follows. The position dependent illumination intensity $(Bel(\vec{x}))$ is multiplied by the dye concentration $Obj(\vec{x})$ presented at the respective object point (object structure) and the result convolved with the point spread function (PSF) of the imaging system (cf. equation (1)):

$$I_m(\vec{x}) = PSF(\vec{x}) \otimes (Bel(\vec{x}) \cdot Obj(\vec{x})) \qquad (1).$$

In reciprocal space, this translates into the convolution of the Fourier transformed illumination function F(Bel(x)) with the Fourier transformed object function F(Obj((x)) and subsequent multiplication with the light-optical transfer function OTF(k) (F refers to the Fourier formation here and in the following, the coordinates in reciprocal space are indicated with k). Analogously to equation (1), the following results:

$$F(I_m(x)) = OTF(k) \cdot (F(Bel(x)) \otimes F(Obj(x))).$$

Generalized to other microscopy processes, $Obj(\vec{x})$ indicates the respective value or the density of the characteristics of the object which is to be detected, and PSF $(\vec{x})$ indicates the effective point spread function of the entire system (image acquisition and reconstruction). This often still approximately applies even in iterative or non-linear reconstruction processes.

In typical imaging systems, the range of the OFT not equal to the value zero, which is also referred to as the "region of support", is restricted by the numeric aperture and the wavelength of the light to be imaged to a specific spatial frequency range (cf. also U.S. Pat. No. 5,671,085). Similarly, the Fourier transformation of the illumination function $F(Bel(\vec{x})$ has the extent of its region of support restricted by the light wavelength and, possibly, apertures of the illumination system.

According to the invention, it is thus provided that the effective range of detectable spatial frequencies of the object $F(Obj(\vec{x}))$ ("object spatial frequencies") be expanded on the basis of the following considerations. With the introduction of a non-linear dependence of the light intensity detected on the object conditions, the right part of equation (1) can be written, generalized according to the expressions (2) and/or (3), as follows:

$$PSF(\vec{x}) \otimes I_{em}(Obj(\vec{x}), \vec{b}(\vec{x})) \qquad (2)$$

$$\rightarrow OTF(\vec{k}) \cdot F(I_{em}(Obj(\vec{x}), \vec{b}(\vec{x}))) \qquad (3).$$

According to the expression (2), no linear connection between the light intensity $I_{em}(\vec{x})$ emitted from an object point and the light intensity irradiated there (contained in $\vec{b}(\vec{x})$) is assumed. Rather, $I_{em}(\vec{x})$ is now a general function of the value of the object structure to be detected and other factors $\vec{b}(\vec{x})$, which represent the non-linear conditions. The vector arrow over $\vec{b}$ is to indicate that there can be multiple conditions or characteristics $b_i$. An important factor $b_i$ is the light intensity $Bel(\vec{x})$ irradiated on the location $\vec{x}$. Other factors are mentioned below for exemplary purposes.

According to equation (4), $I_{em}(\vec{x})$ is approximately expressed as a Taylor series with constant coefficients $c_i$:

$$I_{em}(\vec{x}) \approx c_0 + c_1 \cdot Obj(\vec{x}) + c_2 \cdot b_1(\vec{x}) + c_3 \cdot Obj(\vec{x}) \cdot b_1(\vec{x})$$
$$+ c_4 \cdot Obj(\vec{x})^2 \cdot b_1(\vec{x}) + c_5 \cdot Obj(\vec{x}) \cdot b_1(\vec{x})^2 + \ldots$$
$$+ c_6 \cdot Obj(\vec{x}) \cdot b_1(\vec{x})^3 + \ldots \qquad (4)$$

For simplified presentation, only one non-linear condition $b_1(\vec{x})$ is considered in equation (4). Depending on the application, further conditions could be involved in the process of the emission of light from the respective object point. In this case, corresponding terms also arise in the development according to equation (4), particularly mixed terms such as $c_{5b} \cdot Obj(\vec{x}) \cdot b_1(\vec{x}) \cdot b_2(\vec{x})$. The term after $C_3$ is precisely the expression mentioned in equation (1) if $b_1(\vec{x}) = Bel(\vec{x})$ is assumed as the non-linear object condition. The Fourier transformation of the emitted light intensity $F(I_{em}(Obj(\vec{x}), \vec{b}(\vec{x})))$ thus contains, analogously to equation (1), the term $c_3 \cdot F(Bel(\vec{x})) \otimes F(Obj(\vec{x}))$.

The Fourier transformation of the illumination intensity $F(Bel(\vec{x}))$ can be represented as the sum of multiple individual δ-functions. Depending on the current illumination pattern, parts of the Fourier transformed object function $F(Obj(\vec{x}))$ are thus displaced by the convolution with the Fourier transformed illumination function and added with corresponding weighting. This is illustrated in FIG. 1.

FIG. 1 shows the structure of the excitation distribution in reciprocal space with sinusoidally distributed, low illumination intensity corresponding to a typical spatially patterned illumination. The arrows pointed upward indicate the maxima which result from the sinusoidal excitation (Fourier transformation of the sine function). In addition, the structure of the Fourier transformations of the object function $F(Obj_{+1}(k))$ "coupled" to the maximum $k_p$ is indicated. The Fourier transformations of the object function coupled to the other maxima are not indicated for reasons of clarity. Actually, however, $Obj(\vec{k})$ is "coupled" to each virtual maximum because $Obj(\vec{k})$ is to be convolved with the virtual spatial frequency components in the pattern of the object conditions in reciprocal space. Only the central portion of emitted spatial frequencies (indicated as the region of support of the OTF) is accessible to detection.

How the detectable range is established ("punched out") from the sum corresponding to the convolution mentioned by the optical imaging (multiplication with the spatial frequency limited OTF) is illustrated as an example in FIG. 1. The range of detectable object spatial frequencies is significantly expanded for illumination with a specific pattern relative to the case of a uniform illumination. With the reconstruction process described below, the displaced object spatial frequencies can again be combined into a consistent image.

According to equation (4), in the non-linear case, terms of higher order in $b_1(x)$ also provide contributions to $I_{em}$, such as the terms with the factors $c_5$ and/or $c_6$. The Fourier transformations of these terms are also contained in $F(I_{em}(Obj(x), b(x)))$. With $b_1(x)=Bel(x)$, one also obtains the term $c_5 \cdot (F(Bel(x)) \otimes F(Bel(x))) \otimes F(Obj(x))$ in the expression 2. With a certain component in the image, it is now possible to measure spatial frequencies of the object which were previously not accessible, because they could not yet be displaced, by convolution with the spatial frequency limited function $F(Bel(x))$, into the range detectable by means of OTF. The extent of the region of support from $F(Bel(x)) \otimes F(Bel(x))$ can now, however, be correspondingly larger, with higher spatial frequencies thereby also displacing into the range corresponding to the OFT and thus being measurable in the image. Further higher orders work out correspondingly in further convolutions with the Fourier transformations of $b_i(x)$, so that even higher object spatial frequencies are detectable. In principle, it is possible to detect spatial frequencies of the object of any desired height and thereby to increase the resolution as much as desired, if corresponding coefficients are present in the series expansion according to equation (4). However, in practice, the resolution achievable during reconstruction is often restricted by the signal-noise ratio attainable at the high object spatial frequencies.

Figure 2:
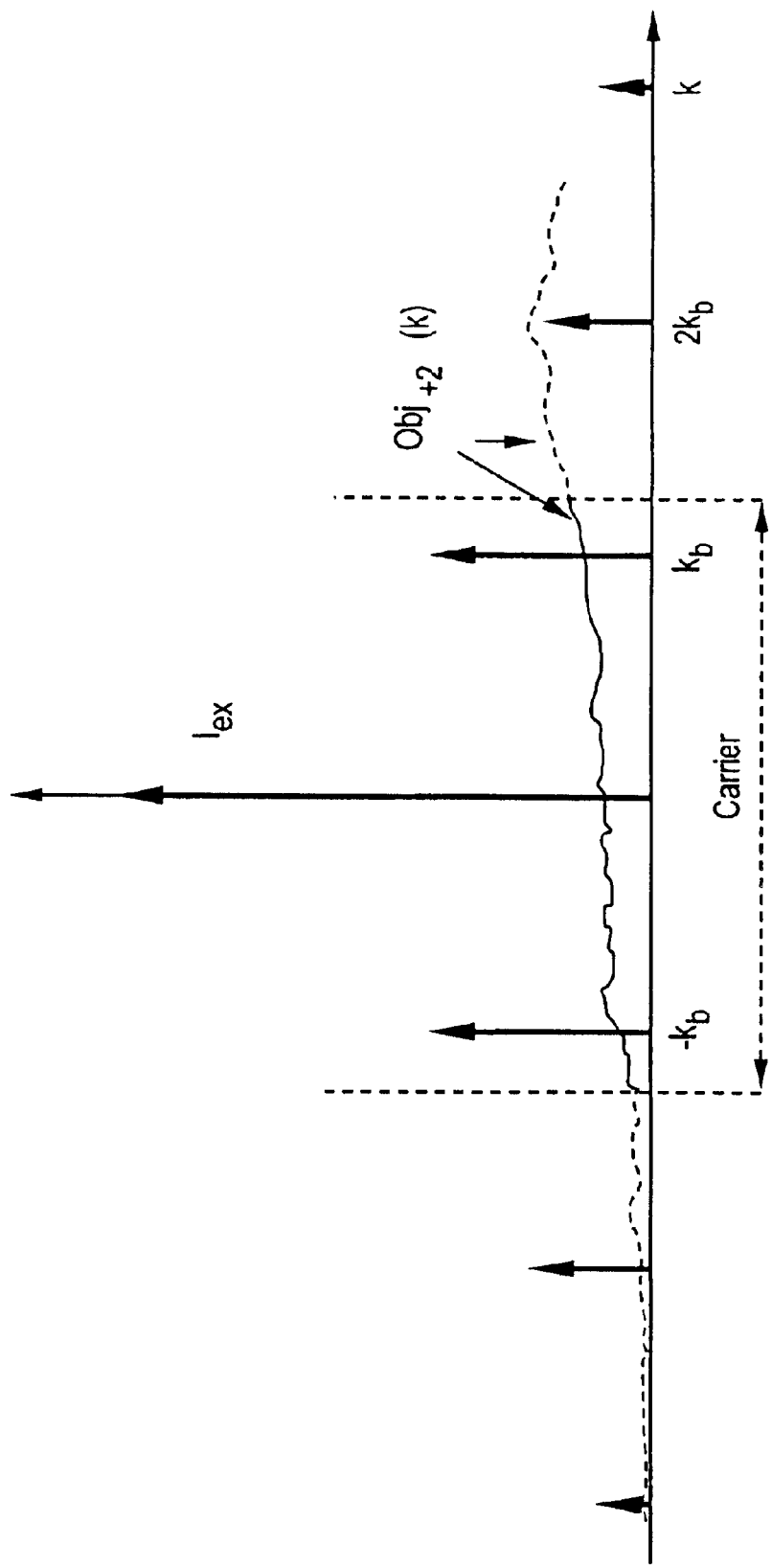
FIG. 2 shows anillustration of object illumination in reciprocal space with a non-linearly distorted excitation pattern.

The effective occurrence of higher and lower frequency components of the illumination pattern in reciprocal space is illustrated in FIG. 2 with reference to the example of fluorescence microscopy. If the object is irradiated with a sufficiently high illumination intensity, a non-linear dependence of the fluorescence emission on the excitation intensity (saturation of the fluorescence) results and therefore a pattern of excitability of fluorescence (in the following: excitation pattern) of a specific dye, which consists in principle of infinitely many (virtual) maxima in reciprocal space, whose absolute height quickly falls, however, as $|\vec{k}|$ increases. As explained above in the example of the relatively weak excitation intensity (linear case, FIG. 1), the object function is coupled to each of the components of the illumination function. All information, particularly about the high-frequency local frequencies of interest of the object function, is therefore contained in a detector signal recorded as partial image $I_{em}$. The reclamation of this information is described below in connection with image reconstruction.

FIG. 2 illustrates the structure of the excitation distribution in reciprocal space for a non-linearly distorted excitation pattern. A coupled structure of the Fourier transformations of the object function $(Obj_{+2}(\vec{k}))$ is drawn to the virtual maximum n=+2 corresponding to $2 k_b$. For practical purposes, $Obj(\vec{k})$ is in turn coupled to each maximum (not shown for reasons of clarity) and overlapped with displaced, varyingly intensive, and phase-shifted versions of itself. Only the central portion of emitted spatial frequencies (region of support of the OTF) is accessible to detection.

The object of optical imaging is obtaining an object image, i.e. the function describing the object $Obj(\vec{x})$. This function must be reconstructed from the measured partial images $I_m$. The reconstruction of the object image is based on the factors $b_i(\vec{x})$ being extracted from the partial images $I_m$ or being known independently of the image acquisition. The differentiation according to the invention of the factors from the function $Obj(\vec{x})$ describing the object is performed in that the factors $b_i$, i.e. the frequently spatially patterned object conditions, are varied.

The variation of the object conditions can occur in various ways. A first possibility is to implement $b_i(\vec{x})$ as a spatial pattern, which is displaced on the object to record each of various partial or single images. Alternatively, it is also possible to change the strength of the pattern (contrast of the object conditions set on the entire object) or the shape of the pattern to record each of the partial images.

In each case, the components shown in the expansion according to equation (4) are different.

The image acquisition of the process according to the invention is based on recording at least two partial images with different object conditions being varied, among them the factors $b_i(\vec{x})$, with which the detected light intensity has a non-linear relationship. The reconstruction of the object image from the partial images is explained in the following.

Reconstruction of the Object Image

According to a preferred embodiment of the invention, the terms contained in the Taylor expansion according to equation (4) are established by the solution of an equation system and thus separated from one another, if they have a measurable influence. The equation system, whose determination is explained in detail below, can be determined and, in principle, solved at each point in the range of the region of support of the OTF in reciprocal space, in spite of multiplication with the OTF.

Through displacement in Fourier space (or through multiplication with $\exp(i\vec{\Delta k} \vec{x})$ in the real space, $\vec{\Delta k}$: frequency space displacement vector), the individual components can then be combined in such a way that a high-resolution image results. This can, if necessary, be processed with further deconvolution techniques in order to further increase the image quality.

As already known from U.S. Pat. No. 5,671,085, the illumination of the object with a pattern made of the highest possible spatial frequencies results in an increase in resolution relative to typical light-optical microscopy. Through the utilization according to the invention of a non-linear relationship between the strength of the pattern, e.g. values of specific object conditions, at an object point and the light intensity going out (emitted and/or diffracted) from this object point, it is possible to calculate an image with an even higher spatial resolution.

An example for the formation of a pattern of object conditions is given in the excitation of fluorescence with a position-dependent distribution of intensive excitation light. The non-linear dependence of the light detected by the detector can, for example, occur due to the saturation of the excitation of fluorescence dyes present in the object. If the excitation light has a sufficiently high intensity, one obtains a non-linear relationship between the irradiated and the emitted light intensity on the object observed (cf, for example, D. R. Sandison et al. in "Handbook of Biological Confocal Microscopy", Plenum Press, New York and London, $2^{nd}$ edition, 1995, chapter 3, pp. 47 to 50: and R. Y. Tsien et al., in the "Handbook of Biologicl Confocal Microscopy" cited, chapter 16). The detected light thus also contains information about spatial frequencies of the object which would otherwise not be accessible. However, each image recorded in this way contains a mixture of components of higher spatial frequencies, which can then, however, be separated and combined into a consistent, high-resolution image by recording under varying conditions and counterbalancing multiple partial images.

The equation system for separation of the components of the Taylor expansion according to equation (4) is, for example, determined with the following steps in the case of fluorescence microscopy for illumination with a structure similar to a linear grating.

The intensity distribution of the excitation light is approximately described in this example by a sine function displaced into the positive range. In the ideal case, point-shaped maxima at k=0, k=+$k_b$, and k=−$k_b$ result as Fourier transformations (cf. FIG. 1). These maxima have, depending on the degree of modulation, a specific energy and a specific phase angle in the complex plane, which depends on the position and/or the displacement (location) of the pattern of the excitation light. Through the Influence of the non-linear dependence of the fluorescence emissions on the excitation intensity (satuaration of the fluorescence), the Pattern shown in FIG. 2 with lower and higher frequency components in reciprocal space results, for example, as the excitability pattern for a specific fluorophore types.

For reconstruction of the object image, it is sufficient to truncate approximately at a finite spatial frequency value $\vec{k}_{max}=\pm m\vec{k}_b$ and to consider only maxima with smaller spatial frequencies in the calculation.

If the excitation light pattern is displaced relative to the object, the respective complex phases of the individual point-shaped maxima in the Fourier space change. If one considers ±m excitation maxima and the maximum at $\vec{k}$=0, one therefore requires Z=2m+1 images recorded under various conditions in order to be able to separate the individual components of the object through the microscope, which are convolved (i.e. displaced) with the current maximum (in FIG. 2, only one component is illustrated). It can, for example, be provided that Z=5 maxima are considered. The phase angle of the maxima in the frequency space of the excitation pattern moves upon displacement of the pattern proportionally to $n|\vec{k}_b|$, because a displacement in the space by $\vec{\Delta x}$ corresponds to a multiplication in the frequency space with $\exp(i\vec{k}\vec{\Delta x})$. In this case, n corresponds to the number of the current spatial frequency component (cf. FIG. 2).

Therefore, if various images (partial image) $I_n(\vec{k})=F(I_n(\vec{x}))$ of the object are recorded, each with the phase of the illumination pattern (i.e. the excitation pattern) displaced by a fifth of the basic pattern relative to one another, the following equation system results:

$$M \cdot \begin{pmatrix} Obj_0(\vec{k}) \\ Obj_{+1}(\vec{k}) \\ Obj_{-1}(\vec{k}) \\ Obj_{+2}(\vec{k}) \\ Obj_{-2}(\vec{k}) \end{pmatrix} = const \cdot \begin{pmatrix} I_0(\vec{k}) \\ I_1(\vec{k}) \\ I_2(\vec{k}) \\ I_3(\vec{k}) \\ I_4(\vec{k}) \end{pmatrix}$$

$$M = \begin{bmatrix} 1 & 1 & 1 & 1 & 1 \\ 1 & \exp(i2\pi/5) & \exp(-i2\pi/5) & \exp(i4\pi/5) & \exp(-i4\pi/5) \\ 1 & \exp(i4\pi/5) & \exp(-i4\pi/5) & \exp(i8\pi/5) & \exp(-i8\pi/5) \\ 1 & \exp(i6\pi/5) & \exp(-i6\pi/5) & \exp(i12\pi/5) & \exp(-i12\pi/5) \\ 1 & \exp(i8\pi/5) & \exp(-i8\pi/5) & \exp(i16\pi/5) & \exp(-i16\pi/5) \end{bmatrix}$$

In this equation system, $Obj_n(\vec{k})$ corresponds to the displaced complex value components of formed object (object spatial frequencies) belonging to the n-th maximum pattern, which are then transmitted by the OTF of the imaging system.

The solution of the equation system provides the individual object components which belong to the respective maximum of the excitation pattern. The solution can, for example, be performed by inverting the matrix M. Through multiplication of the inverse matrix ($M^{-1}$) with the vector on the right of the measured intensities $I_n(\vec{k})$, the individual transmitting object components are determined. If more measurement data are present than is necessary for solving the reconstruction task, an analogous non-quadratic or rectangular matrix can, for example, be drawn up. Then, for example, the process of the pseudo-inverse matrix is usable for the calculation of the solution, which allows a solution with the smallest proportion of errors to be determined.

Due to the linearity of the Fourier transformation, the calculation is preferably performed point by point or pixel by pixel in real space.

The complex value components $Obj_n(\vec{k})$ can now be displaced by the vector $\vec{\Delta k}$ in the Fourier space (or by the corresponding multiplication in real space discussed above), so that the respective spatial frequency $\vec{k}$ ends up where it would be measured in a non-patterned, uniform illumination. $\vec{\Delta k}$ is therefore $-n\vec{k}_b$ in this case.

In a further step, a correction of the components $Obj_n(\vec{k})$ in their complex phases is provided, according to the mutual phase $\phi_n$ of the frequency space excitation maxima in the image $I_n$ (multiplication with $\exp(-i\phi_n)$). Subsequently, the components $Obj_n(\vec{k})$ are combined, if necessary through weighted addition, into a consistent image (the desired object image). In this way, an extension of the region of support of the entire OTF to a range significantly enlarged relative to the linear image and therefore an increase of the resolution capability is made possible.

The displacement of spatial frequency components illustrated can be performed in different space directions. This can occur successively through varying orientation of the illumination pattern or simultaneously through illumination with a multidimensional structure. The resolution capability can be increased in one, two, or three dimensions. The overall transfer function can be altered still further, subsequently or in intermediate steps, by appropriate filters and/or application of unfolding techniques known per se.

The reconstruction of the object image is not restricted to the described solution of the equation system with the matrix methods. Alternatively, for example, squaring techniques (analogous to WO 98/45745) or algebraic and/or iterative reconstruction processes (maximum likelihood/expectation maximization, maximum entropy, algebraic reconstruction, and similar methods) could be used.

The invention is not restricted to the non-linear excitation of fluorescence emissions. The procedure can also be implemented correspondingly with any desired other factors $b_i$ which are suitable, alone or in interaction with one another, particularly in interaction with the illumination intensity, for influencing the light going out from the object.

Embodiments of Optical Systems According to the Invention

Figure 3:
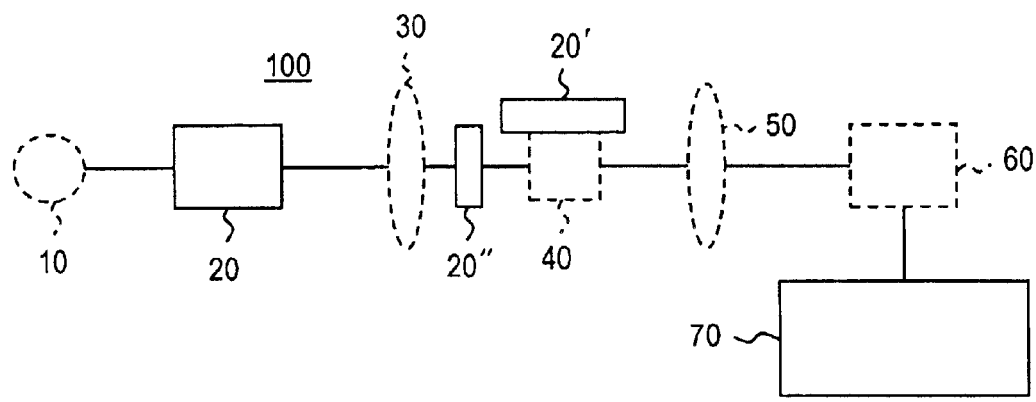
FIG. 3 shows a block diagram of an optical system according to the invention.

An optical system according to the invention is illustrated in FIG. 3. The components of a typical microscope known per se are indicated with dashed frames. The optical system 100 is constructed with an illumination unit 10, at least one pattern generator 20, 20', 20", an illumination optic 30, an imaging optic 50, a detector unit 60, and an image generator 70. The reference number 40 refers to the sample to be examined with the system 100. The components 10, 30, 50, and 60 can be provided by optical components known from optical-light microscopy and from optical measurement and analysis technology, e.g. spectroscopy. Depending on the application, the components 30 and/or 50 can be dispensed with or formed by a shared component. It can also be provided that the components 20 and 30 be formed by a shared optical component.

The pattern generator 20, 20', and/or 20" is generally a device for forming object conditions with a predetermined spatial pattern on the object 40. Depending on the application, the pattern generator 20 can be a mask with a specific one- or two-dimensional transmission characteristic corresponding to the desired pattern. The mask can particularly be formed by a diffraction grating (cf. FIG. 4) (or phase grating) or a matrix assembly made from individually drivable reflector or transmission pixels. In the latter case, DMD units ("digital mirror device") and/or LCD matrix assemblies are used. The pattern generator can also comprise a mirror assembly for generating an interference pattern (cf. FIG. 5) or a device for direct physical or chemical influencing of the object 40 (e.g. a heating device or an ultrasound transmitter). In contrast to the component 20 in FIG. 3, the pattern generator can also be provided between the illumination optic 30 and the object 40 (component 20") or directly on the object 40 (component 20').

The image generator contains a device for reconstruction of the object image corresponding to the principles explained above. A specially designed circuit or an appropriately programmed computer can be used as the image generator. The image generator can contain additional memory, control, and/or display components.

Figure 4:
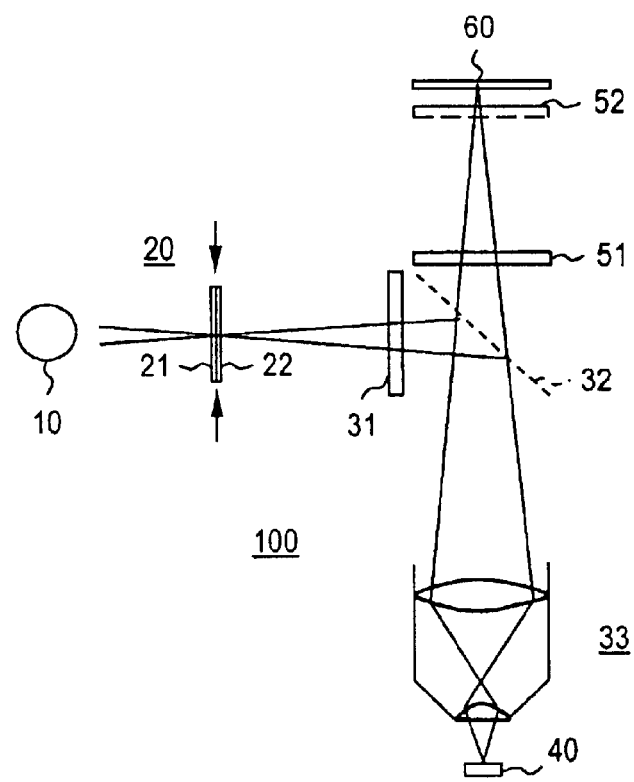
FIG. 4 shows characteristics of an optical system according to a first embodiment of the invention.

FIG. 4 shows features of an optical system according to the invention using the example of an epifluorescence microscope 100. The illumination device 10 is formed by an intensive light source. Because high light intensities are necessary for the utilization of non-linear effects, a pulsed light source, e.g. a pulse laser or a flash lamp, is preferably used. The illumination device can, however, also be formed by a high-pressure vapor lamp (e.g. mercury vapor lamp). An adjustable and possibly rotatable and/or movable diffraction grating 22, which is located corresponding to position 21 of the image field screen in a conjugated object plane, is provided as the pattern generator 20 (mask) as an example. The diffraction grating 22 is a transmission grating with a grating interval of, for example, 30 $\mu$m. The diffraction grating 22 is positioned on an adjustment drive (not shown).

The illumination optic 30 has an excitation filter 31, a dichroic mirror 32 for coupling the excitation light into a microscope column and objective lenses 33. At the location of the object 40, an image of the diffraction grating 22 is formed in the corresponding focal plane as illumination for the sample to be examined. The imaging lens 50 is formed in turn by the objective lenses 33, an emission filter 51, and an optionally provided optic 52 for image enlargement. The detector device 60 is a CCD detector, by which data is transmitted to the image generator (not shown).

In the assembly according to FIG. 4, the diffraction grating 22 can be replaced by a DMD device or an LCD matrix assembly which is positioned in the light path between the illumination device 10 and the object 40. In this case, an additional reduction optic is provided between the components 20 and 40. A DMD device comprises, for example, approximately 400·600 reflector elements with a pixel size of approximately 17*17 $\mu m^2$.

For the recording according to the invention of multiple partial images with different phases, the diffraction grating 22 is displaced in small steps relative to the object 40. The step width depends on the structure dimensions of the mask and the number of partial images to be recorded and is, for example, 30/7 $\mu$m for a 30 $\mu$m structure dimension and 7 partial images. Alternatively, a displacement of the object 40 can be provided for a fixed diffraction grating 22, with this, however, requiring additional steps of image correction during the reconstruction of the object image. Alternatively, it is also possible to influence the phase of the various diffraction maxima directly through suitable optical elements. The minimum number of exposures of partial images necessary for the reconstruction of the complete image results from the number of unknowns of the associated equation system (see above). At least two partial image exposures are intended.

In order to increase the resolution in all spatial directions, the object 40 is illuminated successively with patterns at various angles or with a mask, such as with the DMD or LCD device with a two-dimensional pattern which produces the diffraction maxima in multiple directions of the plane, in various phases in each dimension.

By providing a series of focuses, one can obtain still more information about the axial structure of the object and thereby derive three-dimensional object images. This is simplified even more, on one hand, by the incoherent light source and, on the other hand, by the presence of the zero diffraction order of the grating. A further increase in resolution can be achieved by rotating the object under the optical system around an axis perpendicular to the optic axis.

The object 40 is illuminated and/or excited with instantaneous intensities in such a way that the pigments in the sample become saturated, so that the desired non-linear effect for increasing the resolution capability results. The components of the overlapping individual orders sought can be calculated from the images for various phases of the excitation structure. It is also possible to reconstruct high-resolution images from exposures of partial images with varying illumination intensity. If one suppresses the zero diffraction order of the diffraction grating 21 (e.g. by masking), one thereby advantageously increases the degree of modulation of the illumination function and therefore the relative intensity in higher orders of excitation. In addition, the energy can be displaced into higher spatial frequency ranges.

Figure 5:
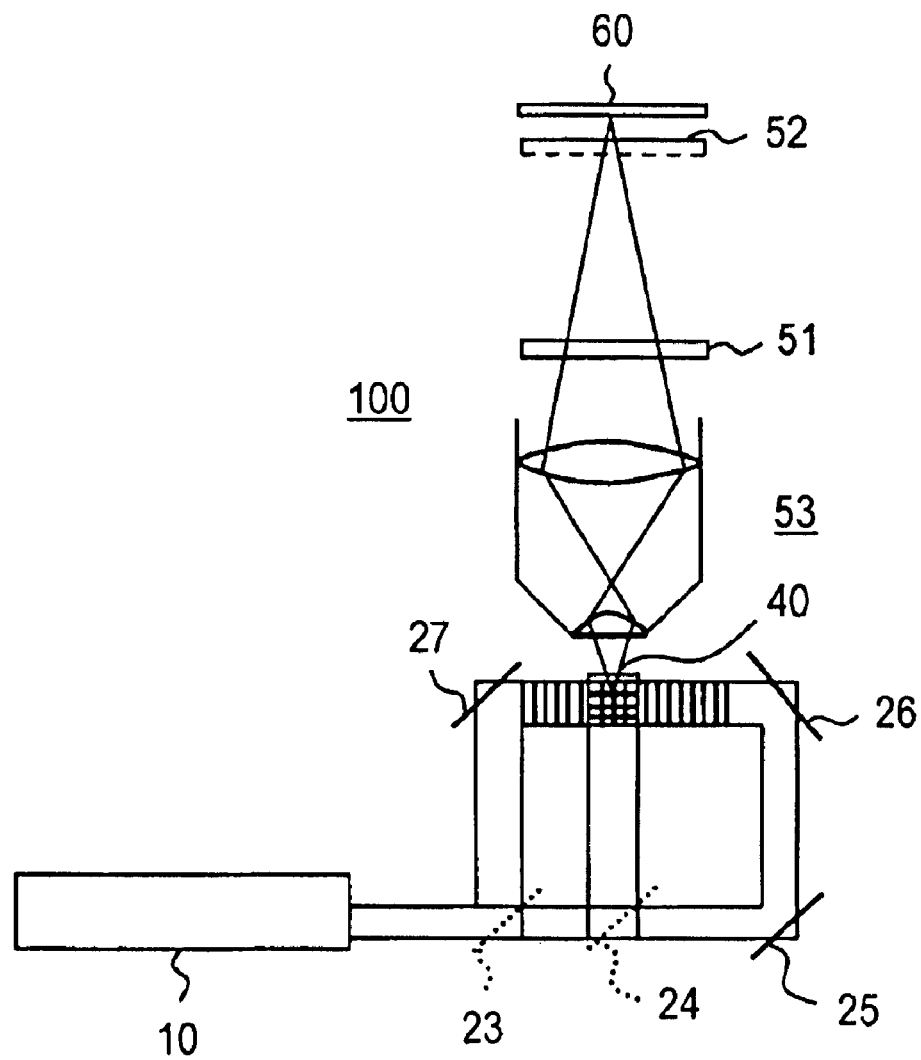
FIG. 5 shows characteristics of an optical system according to a further embodiment of the invention.
Figure 6A:
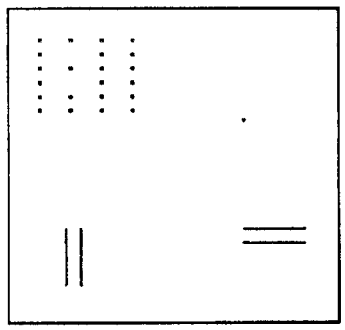
FIGS. 6 and 7 show simulation results for illustration of a process according to the invention.
Figure 6B:
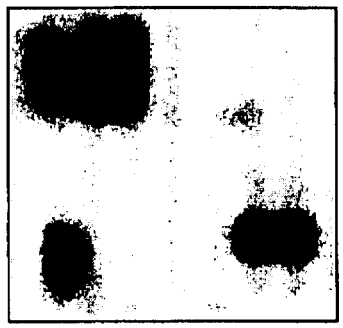
Figure 6C:
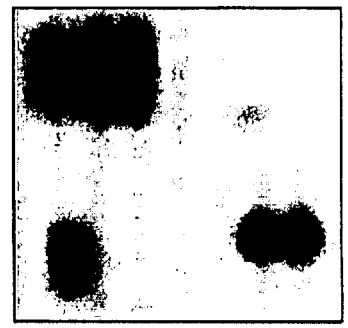
Figure 6D:
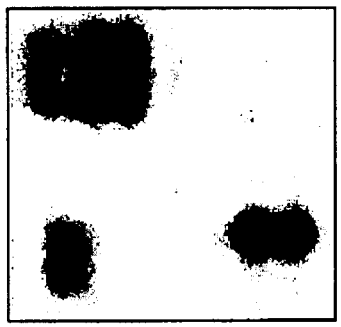
Figure 6E:
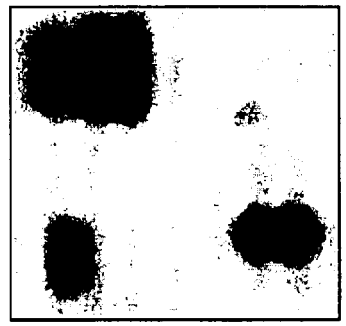
Figure 6F:
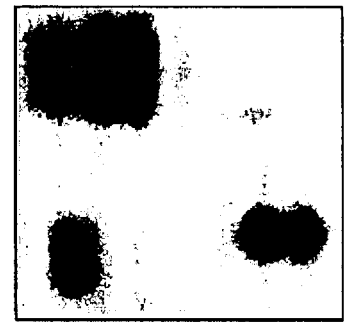
Figure 6G:
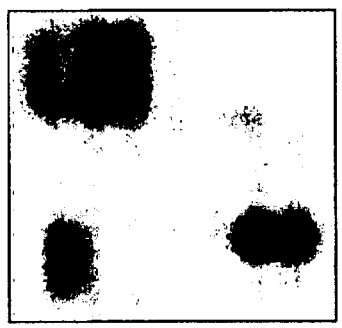
Figure 6H:
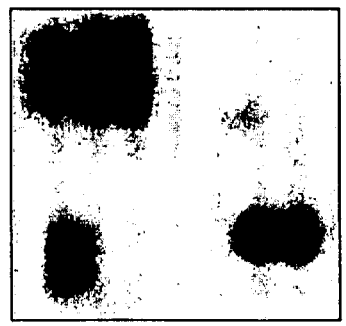
Figure 6I:
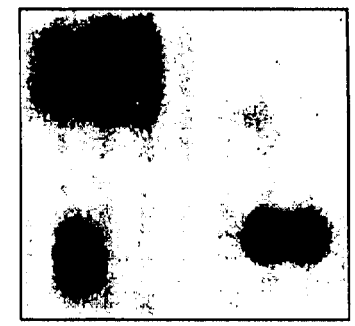
Figure 7A:
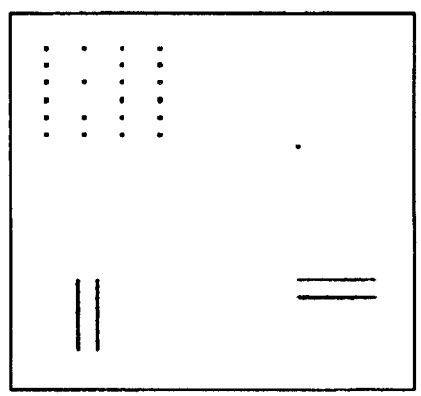
Figure 7B:
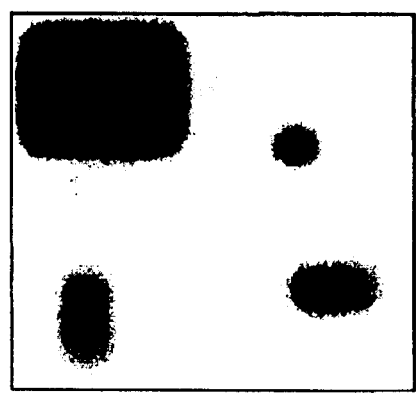
Figure 7C:
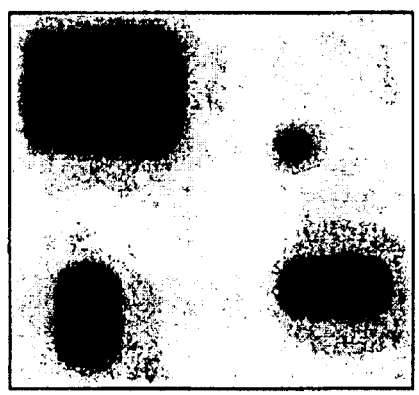
Figure 7D:
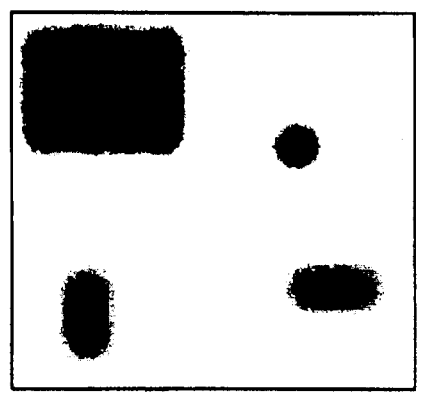
Figure 7E:
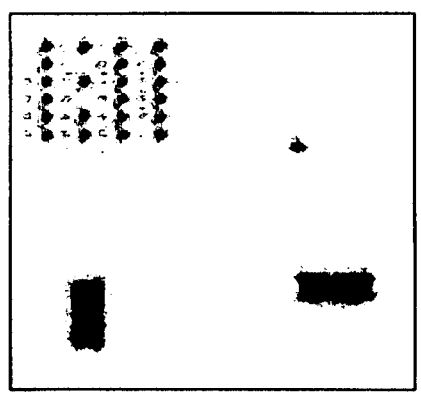
Figure 7F:
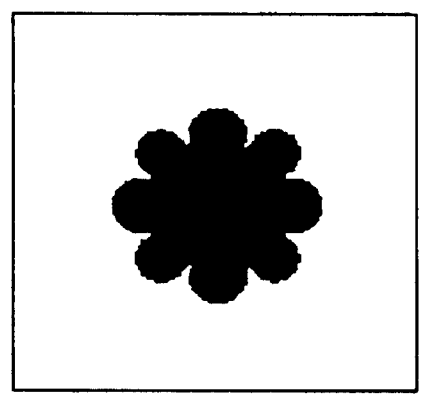

In the altered design of an epifluorescence microscope 100 according to FIG. 5, the sample (the object) 40 is illuminated with laser light. The light source 10 is preferably a pulse laser (e.g. with an optical-parametric oscillator which is pumped with a frequency-tripled NdYAG laser, or with a Ti-sapphire laser), but can also be formed by another sufficiently intensive light source. The pattern generator 20 is formed by a group of flat mirrors 23–27, which are set up for the purpose of dispersing the excitation light from the light source 10 onto various beam paths, which meet the object 40 from various directions. The excitation light is directed onto the object from two opposing sides with the semitransparent mirrors 23 and the completely reflecting mirrors 25–27. Optionally, the second semitransparent mirror 24 can be provided in order to form a third excitation light path to the object 40. Three excitation light beams which interfere with one another result, which allows a use of the microscope 100 in extremely high-resolution 3-D microscopy. For two-dimensional applications, the mirror 24 can be dispensed with. The beams interfere over a range which is of the magnitude of the co-herence length of the light source 10.

To change the object conditions (interference pattern at the object 40) to record various partial images, at least two mirrors are positioned movably. For example, it is provided that the mirrors 24 and 25 are displaceable for changing of the interference pattern. Alternatively, at least one electrooptical element for changing the phase of the illumination light is provided in one of the partial light paths for changing the object conditions.

The illumination optic 30 is not shown in FIG. 5 for reasons of clarity, but can, if necessary, be left out anyway depending on the structural shape. The imaging optic 50 comprises the objective lenses 53, the emission filter for absorption of the excitation light 51, and optionally a optic 52 for image enlargement. A CCD detector 60 is again provided as the detector.

In order to obtain good axial discrimination, the excitation light can also fall on the object 40 simultaneously from one or more directions through the objective (not shown) and/or from the side away from the objective, which is in the differential region of the excitation light beams (crosshatched region). The additional increase in resolution achievable through nonlinearities can in turn be achieved through the use of correspondingly stronger lasers and/or pulse lasers with high instantaneous intensities. The usage of other intensive light sources (e.g. flash light) is possible and sometimes advantageous.

To perform the process according to the invention, multiple partial images are recorded, each with differing interference patterns on the object 40, and processed according to the principles for obtaining the object image explained above.

The exemplary embodiments described are based on the usage of the non-linear dependence of the light detected on the intensity of the excitation light due to saturation of fluorescence pigments. Alternative non-linear effects are given by the saturation of the absorption of excitation light under intensive illumination, the dependence of the phase of the emitted or scattered light on the illumination intensity present in the object, which converts in the detector (e.g. the interference) or before it into a non-linear intensity dependence, SHG or THG processes, a dependence of the light characteristics of the Raman scattering on the value of one or more object conditions, temporally coherent effects (e.g. Rabi oscillations) on atoms or molecules in the object, CARS processes, multiphoton absorptions, stimulated emissions in the object, the population of longer-lived excitation states or chemically altered states in the fluorophores before or during the illumination, radiation-free energy transfer processes, and/or physical or chemical object conditions.

Particularly for the use of temporally coherent effects (Rabi oscillations) on atoms or molecules or fluorophores in the object (in solution, in solid bodies, in gases, or under vacuum conditions), illumination devices with extremely short pulse lengths (e.g. <100 fs) are preferably used. If the non-linear effect is based on stimulated emission, this is induced simultaneously or in temporal sequence. The stimulated emission can be induced at the same wavelength as that of the excitation light or at other wavelengths, e.g. at a typical fluorescence wavelength. The usage of energy transfer processes means that energy of the excitation radiation is transmitted with or without radiation by fluorophores onto neighboring fluorophore molecules and thereby a multilinear dependence of the emitted light intensity on the intensity irradiated onto the neighboring location arises.

The physical or chemical changes of the object conditions particularly include the usage of the non-linear dependence of the light going out from the object points on a spatially inhomogeneous electric or magnetic field or on the pressure, shear forces, or mechanical tension relationships obtaining at the object point. A temperature gradient formed on the object can also be provided corresponding to a specific pattern, which provides the desired multilinear dependence of the light going out from the object point on the respective temperature obtaining. A multilinear dependence of the light going out from the object point on the chemical conditions obtaining there (e.g. pH value) can also be used. In addition, an irradiation of the object with radio waves, microwaves, infrared light, x-rays, or even sound waves or ultrasound waves can be used.

The pattern generator is appropriately adjusted for realization of the effects mentioned. For example, the pattern generator can comprise an additional irradiation device whose emission is focused on the object.

FIGS. 6 and 7 illustrate simulation results for the use of a fluorescence microscope according to FIG. 4. The light intensity is represented here as blackening. For reasons of print technology, the image quality is restricted. For better visualization of the illumination, a constant background fluorescence is assumed in the object (FIGS. 6*a*, 7*a*). FIG. 6*a* shows the simulated object, whose illumination with the processes described and imaging with an epifluorescence microscope is simulated. The partial images b–h represents simulations of partial images, each taken with different phases of the illuminating line pattern. FIG. 6*i* shows an example in which the direction of the illuminating pattern is also changed. The excitation intensity was larger by a factor of 5 than the saturation intensity in this simulation. The maximum expected photon count was 560 photons/pixel in the individual images. FIG. 7 shows the associated reconstruction results. FIG. 7*a* repeats the original image of the simulation. After filtering with the point spread function of a simulated microscope and a Poisson distributed increase of noise (maximum=560 photons), the image from FIG. 7*b* results. The reconstruction according to the invention from partial images, which was simulated with illumination patterns under 3 rotational angles analogously to the FIGS. 6*b* to 6*h*, is shown in FIG. 7*c*. In this case, no amplification of higher spatial frequencies is performed. If the high frequency amplification intrinsic to the system also occurs, the image according to FIG. 7*e* results from FIG. 7*c*. The usage of a corresponding high-frequency amplification with the (convention) image according to FIG. 7*b* would merely result in an image according to FIG. 7*d*. The comparison of the images of FIG. 7*e* and FIG. 7*d* shows the superiority of the process according to the invention of reconstruction of higher spatial frequencies from the recording of multiple partial images. FIG. 7f illustrates the associated simulated carriers of the OTF achieved with the process for a number of maxima Z=7 considered.

Figure 8:
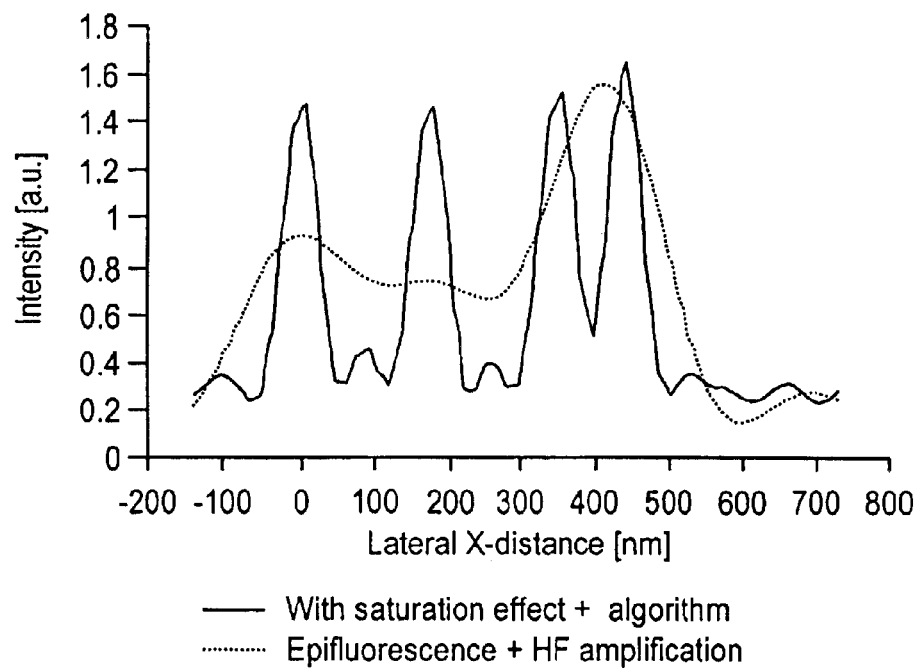
FIG. 8 shows a representation of a curve for illustration of the lateral resolution capability.

FIG. 8 illustrates the improvement of the resolution capability with the process according to the invention. The intensity on a reference line along the two perpendicular columns in the point matrix (above left in the original image) is illustrated in the FIGS. 7d and 7e. The solid line corresponds to the result of the process according to the invention. The single points are clearly recognizable as maxima. With the typical process (epifluorescence followed by high frequency amplification), only the first point (partially) and a maximum between the two lowermost points are recognizable. An improvement of the resolution capability by a factor of more than 3 results for the simulated imaging of a point.

Figure 9:
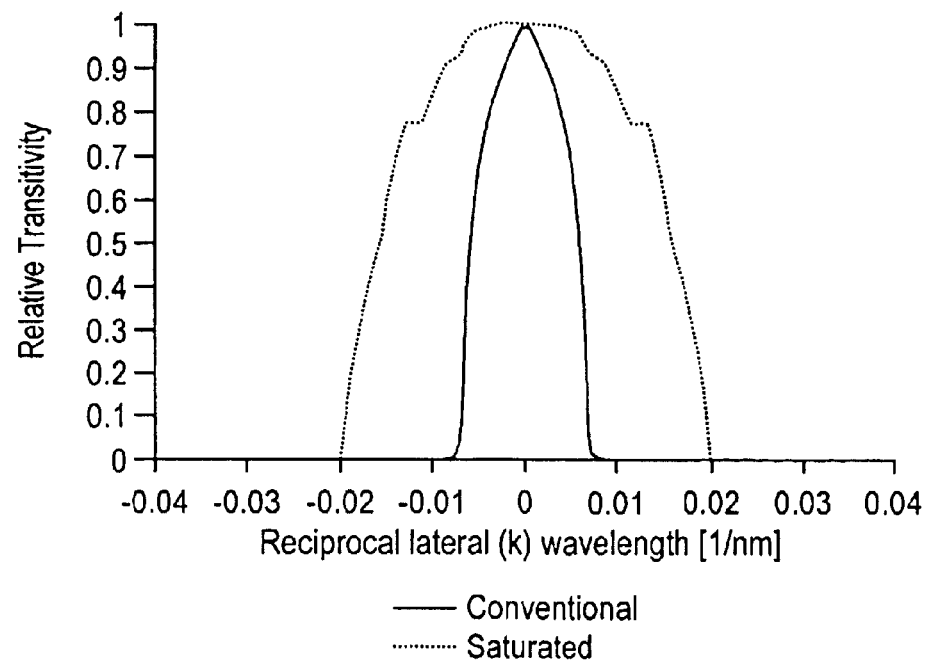
FIG. 9 shows a representation of a curve of the effective total OTF of an optical system according to the invention (with reconstruction)

FIG. 9 shows a lateral section through the simulated effective optical transfer function of the overall system according to FIG. 4. The grating interval of the diffraction grating is selected here in such a way that only the diffraction orders 0, +1, and −1 of the diffraction grating can be transmitted by the objective. Through the partial saturation of the pigments involved, a non-linear relationship between the excitation intensity and the probability of excitation of a pigment molecule at one point in the object space results. This spatially varying excitation probability is also referred to as the excitation pattern. If one assumes that the excitation probability for a specific pigment molecule is a function of the excitation intensity, then a nonlinearity of this function leads to spatially higher harmonics of the excitation pattern also occurring in the emission pattern. Maxima in reciprocal space which lie beyond the spatial frequency limit given by the Abbe limit can then occur in the excitation pattern. The spatial frequency limited imaging of the multiplication of the pigment distribution with the excitation pattern now contains components analogous to a linear excitation with a pattern containing higher spatial frequencies.

In FIG. 9, it can be seen in detail that the transfer function in a typical image with a microscope objective (with subsequent application of high frequency amplification) is relatively narrow, corresponding to the solid line, while in contrast the transfer function for the use of saturated illumination (with high frequency amplification) is significantly expanded (shown as a dashed line).

Figure 10A:
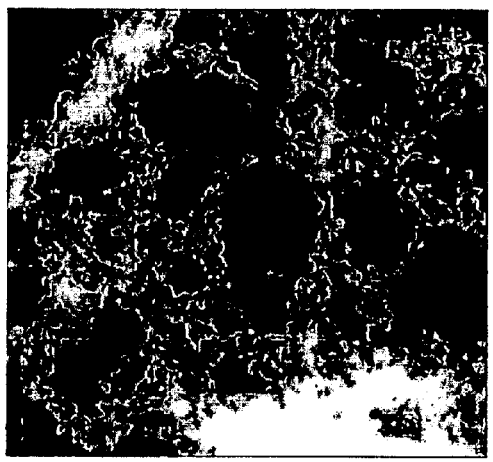
FIG. 10 shows examples of object images.
Figure 10B:
Figure 10C:
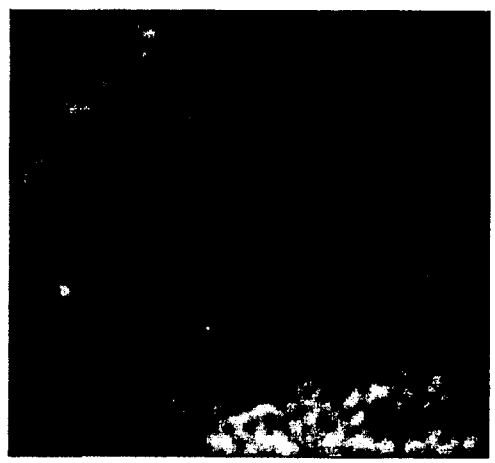

FIG. 10 shows a simulated application of the process according to the invention on a sectional image of the cell nucleus of an embryonic bovine cell recorded by means of electron microscopy. FIG. 10a illustrates the inverted electron microscope section near the nuclear membrane with the nuclear matrix. The simulated epifluorescence microscopy exposure with deconvolution results in the typical image shown in FIG. 10b. With use of the process according to the invention, the image shown in FIG. 10c results. The image taken and evaluated with the method of saturated lateral modulation and subsequently deconvolved (maximum: 560 photons in the single image) is significantly improved compared to the typical image and comparable with the original electron microscope image.

The features of the invention disclosed in the preceding description, the drawings, and the claims can be significant for the realization of the invention in its various embodiments individually and in any desired combination.

What is claimed is:

1. A process for obtaining an object image of at least one object comprising:

illuminating the object with illumination light from an illumination light source, providing at least two different object conditions on the object, said object conditions comprising light intensity of said illumination light or a physical or chemical condition at a location of the object influencing at least one characteristic of light from the object and said object conditions being formed on the object with at least one spatial pattern, wherein said light from an object point of the object having a non-linear dependency upon at least one of the object conditions or a multi-linear dependency upon at least two of the object conditions provided at the object point, capturing at least two partial images of the object corresponding to the formation of said object conditions, wherein the partial images contain different contributions of various spatial frequency components of the object structure, and determining a desired object image by computational reconstruction of the spatial frequency components.

2. The process according to claim 1, wherein spatial patterns of at least one object condition are formed, for each of which the non-linear dependence of the detected light emitted from the object point exists.

3. The process according to claim 1, wherein spatial patterns are formed by at least two object conditions, for which a dependence of the detected light on a multiplicative linking of the object conditions and a linear or a non-linear dependence of the detected light on each of the object conditions exists.

4. The process according to claim 1, 2 or 3, wherein the spatial pattern is given by a pattern of an illumination intensity on the object and the object is illuminated with the pattern of the illumination intensity in such a way that a non-linear dependence of the light intensity, detected at a detector device, coming out from the object point to the illumination intensity obtained at this object point exists.

5. The process according to claim 1, 2 or 3, wherein the spatial pattern of an object condition in reciprocal space can be described or approximately described by a number of points which are distributed in one, two, or three dimensions, or is formed spatially periodically or approximately periodically in one or more dimensions in the location space.

6. The process according to claim 1, 2 or 3, wherein the object and the spatial pattern are displaced in one or more directions relative to one another to achieve various object conditions.

7. The process according to claim 6, wherein the pattern is generated by a mask or by interference and a displacement of a mask is achieved by displacement of the phase of various diffraction maxima.

8. The process according to claim 1, 2 or 3, wherein the object conditions are changed according to a predetermined temporal structure and the partial images are taken at various times.

9. The process according to claim 8, wherein illumination intensity is varied to generate different object conditions.

10. The process according to claim 1, 2 or 3, wherein the reconstruction of the object image from the partial images is performed by solving an equation system, taking into account the non-linear dependencies, or by an iterative procedure.

11. The process according to claim 1, 2 or 3, wherein the position of the object or one or more partial objects of the object is determined.

12. The process according to claim 1, 2 or 3, wherein the reconstruction of the object image is performed by consideration of a previously known structure of the object or of parts of the object.

13. The process according to claim 1, wherein reconstructing the desired object image involves computational separation of spatial frequency components.

14. An topical imaging system comprising:

an illumination device and a detector device arranged for illuminating an object and recording an image of the object or of parts of the object, at least one pattern generator arranged for generating at least two different object conditions on the object, said object conditions comprising light intensity of said illumination light or a physical or chemical condition at a location of the object influencing at least one characteristic of light from the object and said at least one pattern generator being arranged for forming said object conditions on the object with at least one spatial pattern, with the illumination device and/or the pattern generator being arranged for generating said object conditions such that light from an object point of the object having a non-linear dependency upon at least one of the object conditions or a multi-linear dependency upon at least two of the object conditions provided at the object point, and an image generator arranged for computational reconstruction of an object image from partial images which were recorded with the detector device.

15. The optical system according to claim 14, wherein the pattern generator comprises a mask with which a spatial pattern of an illumination intensity can be formed on the object.

16. The optical system according to claim 15, wherein the mask comprises a multidimensional diffraction grating, a phase grating, a DMD device, or an LCD matrix.

17. The device according to claim 15 or 16, wherein the mask and a sample are positioned so they are movable and/or rotatable relative to one another.

18. The optical system according to claim 14, wherein the pattern generator comprises a mirror assembly arranged for generating an interference pattern on the object.

19. The optical system according to claim 14, wherein the pattern generator comprises a device for achieving predetermined physical or chemical conditions on the object corresponding to the spatial pattern.

20. The optical system according to claim 14, wherein an adjustment device for displacement of the object in the spatial pattern of the object conditions is provided.

21. The optical system according to claim 14, 15, 16, 19 or 20, wherein the illumination device comprises a flash lamp, a laser, or a high-pressure lamp.

22. The optical system according to claim 14, 15, 16, 19 or 20, wherein illumination optics and/or an imaging optic are provided.

23. An optical imaging system according to claim 14, wherein the image generator is arranged for computational separation of spatial frequency components.

* * * * *